Feb. 23, 1965 L. HORN ETAL 3,170,818
SEALED MINIATURE STORAGE BATTERY
Filed Oct. 14, 1960 2 Sheets-Sheet 1

INVENTORS
LUTZ HORN
BY FRITZ PHILIPP
ATTORNEYS

Feb. 23, 1965   L. HORN ETAL   3,170,818
SEALED MINIATURE STORAGE BATTERY
Filed Oct. 14, 1960   2 Sheets-Sheet 2

INVENTORS
LUTZ HORN
BY FRITZ PHILIPP
ATTORNEYS

United States Patent Office 3,170,818
Patented Feb. 23, 1965

3,170,818
SEALED MINIATURE STORAGE BATTERY
Lutz Horn, Hagen, Westphalia, and Fritz Philipp, Hagen-Haspe, Germany, assignors to Varta Aktiengesellschaft, Hagen, Germany
Filed Oct. 14, 1960, Ser. No. 62,745
8 Claims. (Cl. 136—6)

This invention relates to alkaline type storage batteries and more particularly to hermetically sealed miniature storage batteries consisting of one or more cells in which the electrolyte is substantially immobilized.

It is a well known fact that in the case of the conventional alkaline type storage battery, an evolution of oxygen and hydrogen gases will take place during charging and over-charging, respectively. With the conventional open type storage battery, provision is normally made for ready release of these generated gases by means of vents. Furthermore, in the open type cell the water lost due to electrolysis can readily be replaced at regular intervals. It is evident that the removal of gases generated in the course of charging and over-charging of the gas-tight sealed storage battery must be effected by means furnished within the cell itself.

Gas-tight miniature storage batteries, for example in the form of button cells or round cells, have been developed and used for many purposes, particularly for portable apparatus such as transistor radios, hearing aids, flashlights, electric razors and the like. Miniature primary cells have also been manufactured for similar applications.

It has been proposed in the prior art to safeguard a sealed cell against the development of excessive internal gas pressure by the addition of noble metals to the active masses or by the employment of separate electrodes of these metals. However, no technically sound solution to this problem has been achieved by these means. As a consequence, presently available gas-tight miniature storage batteries are not considered to be operationally safe for many applications, particularly those in the medical and biological fields, such as for radio probes in the field of pharmacological research, and for choloscopy in the field of medical diagnostics. Additionally it has been found that the known miniature storage battery types are unfit for many fields of utilization, particularly those referred to above, since they are still too bulky.

It is a principal object of the present invention to provide a gas-tight miniature storage battery, which, due to its small size, is particularly well suited for the aforementioned applications and which in spite of its minute dimensions is completely tight with respect to both gases and liquids.

The aforementioned object is achieved in accordance with the invention by properly proportioning the active electrode masses within a permanently sealed container so that the evolution of hydrogen gas within the cell is completely suppressed. In a preferred embodiment of the invention, the electrochemical capacity of the negative electrode is proportioned to that of the positive electrode by a ratio of two to one, or greater, so that when the battery is charged up to the full charge of the positive electrode, the negative electrode is provided with a reserve charge amounting to 50 percent or more of its capacity. A gas-pervious spacer having capillary structure is provided between the active masses, and the alkaline electrolyte is absorbed by the spacer and substantially immobilized by capillary force.

It has been proposed in the prior art to impart to the negative electrode of gas-tight storage batteries a reserve charge of approximately 10 to 30 percent of the capacity of that electrode in order to render said storage batteries operatively safe both for charging and over-charging time intervals. Experience has shown that this technique does not provide an operatively safe storage battery, particularly where, due to lack of room, all other additional means which are used in larger cells for consuming gas (e.g., freely exposed parts of the electrode surface, splitting the electrodes into a plurality of sectional electrodes in conjunction with spaces, etc.) must be dispensed with.

In accordance with the present invention, the reserve charge of the negative electrode is increased by 50 percent (i.e., 100 percent with respect to the positive electrode). This technique makes it possible to build a miniature gas-tight storage battery having extremely small dimensions in which no harmful internal pressures can arise either during charging or over-charging and which therefore can be considered to be perfectly safe while in operation.

In the storage battery of the present invention the oxygen generated at the positive electrode during charging and over-charging time intervals is absorbed at a definite but not excessively high pressure by the negative electrode. Absorption of the oxygen at the negative electrode prevents the generation of hydrogen at this same electrode. The consumption of the oxygen coupled with prevention of the generation of hydrogen proceeds at such a high rate that operation with charging and discharging currents as high as 20 ma. per square cm. is quite possible.

A separator having capillary structure is employed for fixing the electrolyte, i.e., the electrolyte is retained completely by the separator or spacer and substantially no free electrolyte is present within the cell. Since the electrodes and the spacer mounted therebetween are all made of porous materials, oxygen generated at the negative electrode is free to migrate to the positive electrode.

In conventional alkaline-type batteries, the evolution of gaseous hydrogen at the negative electrode normally takes place when this electrode is nearly fully charged due to the electrolytic decomposition of water. In the battery of the present invention employing nickel hydroxide as a positive active material, cadmium hydroxide as a negative active material and potassium hydroxide solution as the electrolyte, the following reactions may proceed at the negative electrode resulting in the suppression of hydrogen gas evolution:

$$2Cd + O_2 + 2H_2O \rightarrow 2Cd(OH)_2 \tag{1}$$

$$2Cd(OH)_2 + 4e \rightarrow 2Cd + 4OH^- \tag{2}$$

Equation 1 represents the chemical oxidation of metallic cadmium in the negative electrode to cadmium hydroxide, and Equation 2 represents electrochemical reduction of the cadmium hydroxide back to metallic cadmium.

An electrochemical reduction of oxygen may also take place at the negative electrode wherein oxygen is combined with water to form hydrogen-peroxide in accordance with the following equation:

$$2O_2 + 2H_2O + 4e \rightarrow 2OH^- + 2HO_2^- \tag{3}$$

The hydrogen-peroxide may then break down and recombine to form water.

Furthermore, any hydrogen generated at the negative electrode may be directly oxidized by nascent gaseous oxygen in accordance with the following equation:

$$2H_2 + O_2 \rightarrow 2H_2O \tag{4}$$

As long as the negative electrode contains a surplus amount of chargeable active material, i.e., cadmium hydroxide, at the point when an equilibrium between the formation and removal of oxygen has been established, the evolution of hydrogen at the negative electrode is definitely suppressed as above indicated. The excess amount of active material added to the negative electrode for the prevention of hydrogen evolution is herein referred to as the charge reserve of that electrode.

In accordance with one featured aspect of the invention, a unique single-cell form of construction is provided wherein a contact prong having a relatively large surface is provided to serve as a cover for the cell and at the same time function as a low-resistance contact with one of the active electrodes.

In order to achieve a particularly effective seal for the miniature storage battery container, the cell cover is, in a further preferred form of construction, provided with a peripheral rim in the form of a sharp edge. The cell casing or housing along with an internal sealing gasket is crimped around the peripheral rim of the cover to provide an effective gas-tight seal.

The storage battery devised in accordance with the invention may also be used in multiple cell arrangements wherein cells are operatively connected togther in pairs either by a single cover plate having dual prong contact members, or by separate mating type cover plates each having a contact prong which engages an individual electrode. Due to the configurations of the various contact cover members, particularly good cell sealing is effected and good electrical contact is achieved between the individual cells within a minimum amount of space. Furthermore, excellent mechanical strength is obtained at the sealing juncture between the two cells.

The above objects and various other features and advantages of the invention will be better understood by referring to the accompanying drawings together with the following detailed descriptions thereof. In the drawings.

Figure 1:
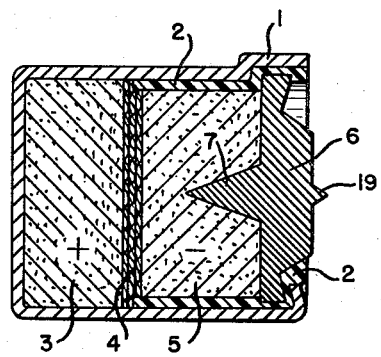
FIG. 1 is a sectional view showing a preferred embodiment of a single cell battery constructed in accordance with the invention.

The miniature gas-tight storage battery shown in FIG. 1 includes an electrically conductive casing 1, made of nickel, nickel plated steel or steel, synthetic plastic lining 2 inserted into the casing at its open end, positive active material 3, a separator 4 and negative active material 5. The casing 1 is advantageously made cylindrical in shape to provide a maximum structural strength for withstanding high internal gas pressures that may be temporarily generated during the charge and discharge cycles. The electrodes are likewise cylindrical in shape and preferably have a spongy skeleton-type structure. The support for both the positive and the negative electrodes is advantageously made from a powdered nickel or a flake nickel having a particle size between 1 and 10 microns, and preferably 3 microns. With this structural arrangement, the positive active material may be composed either of pure nickel hydroxide or of a mixture of nickel hydroxide with a small proportion of cadmium hydroxide. The nickel structure for the negative plate is then packed with cadmium hydroxide. It will be apparent to those skilled in the art that other structures may be used for both active materials, for example, 20 percent graphite and 80 percent nickel hydroxide may be used for the positive plate, and cadmium and cadmium hydroxide in various compositions for the negative plate. Other known materials may be used for the electrodes, such as, for example, silver for the positive material and cadmium for the negative material.

The cover plate 6 has a spike 7 which projects into the conducting structure of the negative material, as shown, thereby establishing an effective low resistance electrical contact therewith. The material for cover 6 and for the spike 7 is preferably nickel or nickel plated steel. A small spur 19 is provided on the top face of the cover plate to afford good electrical contact with co-operating cells or other apparatus. The separator 4 is made of a material having a capillary structure such as, for example, nylon fabric which may be made of plain or crimped yarn. The fabric thickness may vary between 0.1 and 0.3 millimeter, and have a pore diameter which is less than approximately 15 microns. The small pore diameter serves to immobilize the alkaline electrolyte by capillary action. Additionally the pores make the separator permeable to gas. A potassium hydroxide solution (up to 30 percent) is used as an electrolyte.

As shown in the lower part of FIG. 1, an effective gas-tight and liquid-tight seal is obtained by crimping or turning inwardly the open-end edge of the casing over the peripheral face edge of metal cover 6. The corner of this edge is, as illustrated, formed at an angle of less than 90° in order to enhance the seal. In this operation the synthetic plastic layer 2, which functions as an insulator as well as a sealing gasket, is compressed between the crimped casing edge and the mentioned sharp corner of the contact cover plate, thereby providing a gas-tight seal.

In accordance with one important aspect of the invention, the sealed miniature storage battery is provided as described above with an excess of negative active material. The negative plate is thereby given a charge reserve having an excess of uncharged cadmium hydroxide particles at the negative plate. This charge reserve operates to inhibit the evolution of hydrogen gas during the charging cycle until oxygen consumption becomes steady. According to the invention the charge reserve is made about 100 percent that of the usable capacity of the negative electrode. The evolution of hydrogen gas is thereby completely suppressed.

One of the outstanding advantages of the structural arrangement shown in FIG. 1 resides in the fact that contact springs with associated contact caps are eliminated. Thus the cell may be made to dimensions considerably smaller than those in the prior art. Batteries having a volume between about 0.05 and 0.2 cubic centimeter have been constructed as shown and described. It will be apparent to those skilled in the art that it becomes impossible to provide large absorption surfaces to assist in gas consumption where the battery is made to such small dimensions. The miniature cylindrical container employed to house the gas-tight battery of the present invention is capable of withstanding extremely high gas pressures, much higher than the casing that is used for larger cells. This is a favorable factor since high gas pressure assures good gas consumption within the new cell despite the relatively poor absorptive capacity of the cell.

Figure 2:
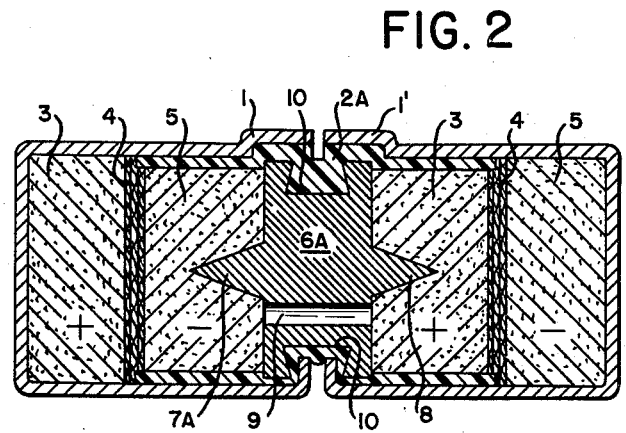
FIG. 2 is a sectional view showing the structural features of a dual cell battery employing a single interconnecting cover member and a single sealing and insulation gasket.

FIG. 2 shows a preferred embodiment of a gas-tight storage battery employing two separate cells which are permanently attached and electrically connected together and sealed. The positive electrode material 3 of the right-hand cell is connected to the negative electrode material 5 of the left-hand cell by cover member 6A having two contact spikes 7A and 8. The respective spike members 7A and 8 are readily inserted and embedded in the spongy metal of the two cells thereby achieving a minimum of electrical contact resistance therebetween. A one-piece synthetic plastic lining 2A is provided to electrically insulate the separate casings for the two cells and at the same time establish a gas-tight seal for the joined cells. As shown in the drawing, the one-piece sleeve is held in place both by its shape and by the special dovetail groove 10 provided around the periphery of the central portion of the single cover member 6A.

A gas-tight and liquid-tight seal is completed for the double cell structure shown in FIG. 2 by crimping the edges of both cell casings into the peripheral groove 10 in the cover member 6A (see bottom of groove in FIG. 2). The upper part of FIG. 2 shows the original shape of the casings 1 and 1' and the synthetic-plastic lining prior to the crimping of the casing edges into the dovetail groove. It will be apparent that the sharp edges (less than 90°) of the dovetail structure effectively enhance the seal for the battery as internal gas pressure increases.

Figure 3:
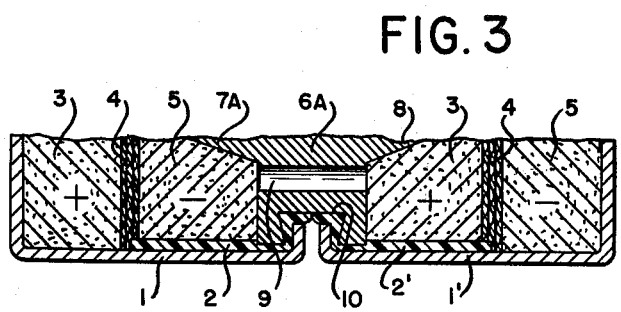
FIG. 3 is a partial sectional view showing the structural feature of a dual cell having a single cover member but separate insulation and sealing gaskets.

The fragmentary sectional drawing of FIG. 3 illustrates a slightly different structural arrangement for connecting two miniature cells together. In this alternative arrangement separate insulating linings 2 and 2' are provided. Using this structure each cell may be assembled along with its own individual insulating lining or gasket, and the cover member 6A may be finally inserted as the last step in the assembly procedure. The crimping operation of the casing edges into the dovetail groove in the contact member 6A is the same as that described for FIG. 2 above.

Duct 9 is provided in this as well as in the FIG. 2 embodiment to equalize gas pressures generated internally within the separate cells. Since it is not possible to produce gasing in two cells at the same time, this duct is provided to equalize the gas pressures in the two cells and thereby facilitate consumption of the gases within the cells. The diameter of the duct should be such that the caustic electrolyte solution is not held in the duct by capillary action. In this connection a diameter of approximately 1.5 millimeters has been found to be satisfactory. In order to assure that the electrolyte is retained in the electrodes, inserts of suitable expanded metal may be inserted both above, and below the cover member.

Figure 4:
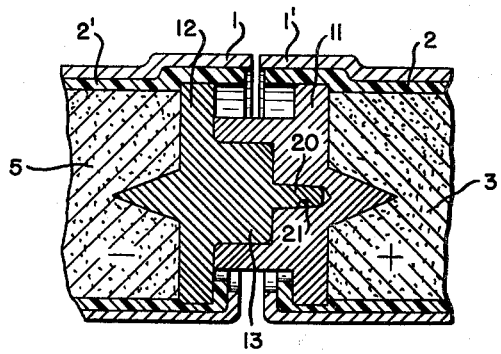
FIG. 4 is a sectional view showing a dual cell battery employing separate mating covers for connecting a pair of miniature cells together.

FIG. 4 shows a further structural arrangement for connecting together two hermetically sealed miniature cells having separate mating top covers 11 and 12, respectively. Cover 11 is designed as shown to co-operatively receive the substantially cylindrical portion 13 of cover 12. The separate covers are nested together with tapered tip 20 within the complementary recess 21 as shown, and may be spot welded along the outer periphery of their juncture. Separate insulating gaskets 2 and 2' are here provided to effect the sealing action as described above in connection with FIG. 3. As in FIG. 2, the upper parts of the casings 1, 1' are represented prior to the crimping operation.

Figure 5:
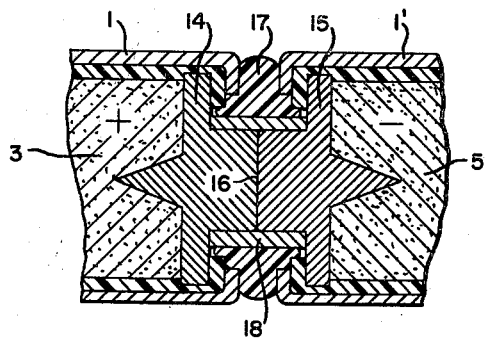
FIG. 5 is a fragmentary sectional view illustrating a further embodiment of a dual cell battery constructed in accordance with the invention.

Referring to FIG. 5, there is shown another structural arrangement for effecting a gas-tight and liquid-tight seal as well as an excellent electrical connection between two battery cells. Cover members 14 and 15 are identical and provide an excellent electrical connection through their common relatively large contact surfaces 16. In constructing the battery the separate covers 14 and 15 are connected and secured together by tubular metal band 18 which is permanently joined to the separate covers by spot welding. Gas-tight and liquid-tight seals are effected as described above by crimping the separate edges of the two casings around the peripheral edges of the contact members 14 and 15 as shown. In order to enhance the sealing of the two cells, the recess therebetween is filled with an insulating material 17. This material may advantageously be an epoxy resin such as "Araldite" manufactured by Ciba Products Corp. The epoxy resin or the like is advantageously applied in molten form in order to effect excellent sealing. This sealing procedure prevents corrosion at the juncture 16 of the cover members 14 and 15, as well as on the surfaces with which it is in contact.

In an alternative arrangement (not shown), two cells can be connected together by spot welding a metal crosspiece to each surface 16 with the two cells standing side by side. The above connection is effected after each cell has been individually sealed by the crimping action described above. The two cells are then brought into a co-linear position as shown in FIG. 5 (one behind the other) by bending or folding the cross-piece through an angle of 180°.

Although FIGS. 2 through 5 show the preferred structural arrangements for connecting only two miniature storage batteries together, it will be apparent to those skilled in the art that these various arrangements may be employed in connecting any number of miniature cells together to produce a desired operating potential and current. The sealing and coupling arrangements shown and described for the dual cell arrangements afford an extremely compact battery having excellent efficiency and reliability. The dimensions of a double cell constructed in accordance with the invention are 8 to 10 millimeters in length and approximately 4 millimeters in diameter.

Several preferred embodiments of the invention have been shown and described. Various changes may be made without departing from the scope of the invention as set forth in the following claims.

We claim:

1. An hermetically sealed miniature storage battery of the alkaline type comprising at least one cell, each cell having a positive electrode and a negative electrode, each electrode comprising a porous metallic structure, the electrochemical capacity of the negative electrode being at least twice that of the positive electrode, a separator disposed between said electrodes, said separator having a capillary structure pervious to gas, an alkaline electolyte substantially completely absorbed by said separator and immobilized therein by the said capillary structure, a metallic casing having an open end, said casing being proportioned to receive and house said positive electrode, said separator and electrolyte and said negative electrode in stacked contacting relation, a metallic cover provided with a tapered and pointed contact spike to pierce and electrically engage a porous electrode at the open end of said casing, said cover being also in electrical contact with said electrode, gasket means for insulating said cover and the electrode engaged therewith from said casing, and means for hermetically sealing said cover in the end of said casing.

2. A miniature storage battery according to claim 1, characterized in that it comprises two cells connected together with the open end of each casing hermetically sealed to a common metallic cover, said metallic cover having tapered contact spikes extending from opposite sides thereof, each said spike being buried in electrical contact with an electrode of opposite polarity in the respective adjacent cell.

3. A miniature storage battery according to claim 2, characterized in that said metallic cover has a dovetail-shaped groove around the periphery substantially midway between the respective contact spikes, and said gasket means comprises a compressible tubular insulating member which bridges said groove and envelopes both electrodes contacting said cover, the respective ends of the casings being crimped inwardly against the gasket in said dovetail groove, whereby the battery is hermetically sealed.

4. A miniature storage battery according to claim 3, characterized in that said metallic cover includes a gas duct communicating between the opposite surfaces thereof for equalizing gas pressures between the connected pair of cells.

5. A miniature storage battery according to claim 1, characterized in that it comprises two cells which are connected together as a pair, the open end of one cell casing being hermetically sealed to a male-type cover plate having a contact spike on the inner side which is buried in and electrically engages an electrode and having a substantially cylindrical extension with a tapered tip on the outer side, the open end of the second cell casing being hermetically sealed to a female-type cover plate having a tapered contact spike on the inner side which is buried in and electrically engages an adjacent electrode of opposite polarity, and two cylindrical recesses on the outer side of said female-type cover plate which are adapted respectively to receive said cylindrical extension and said tapered tip on said male-type cover plate, opposite sides of said cover plate being also in electrical contact with said adjacent electrode, so as to form a low-resistance electrical intercell connection having great mechanical rigidity.

6. A miniature storage battery according to claim 1, characterized in that it comprise two cells which are connected together as an electrical pair, the open end of each cell casing being hermetically sealed to separate and identical cover plates, each cover plate having a contact spike on its inner side which is buried in and electrically engages an electrode, and having a substantially cylindrical extension with a relatively large flat end surface on the outer side of said extension, a cylindrical metal band encircling and coupling both said extensions, said band being welded to both cover plates so as to retain said end surfaces and said cover plates in firm electrical connection and to form the core of a recess between said cover plates, and an epoxy resin substantially filling said recess.

7. An hermetically sealed miniature storage battery of the alkaline type comprising at least one cell, each cell having a positive electrode and a negative electrode of cylindrically shaped porous metal, the electrochemical capacity of the negative electrode being at least twice that of the positive electrode, a separator disposed between said electrodes and in contact therewith, said separator having a capillary structure pervious to gas, an alkaline electrolyte substantially completely absorbed by said separator and immobilized therein by the said capillary structure, a cylindrical metallic casing having an open end and a closed end, said casing being proportioned to receive and house said positive electrode, said separator and electrolyte, and said negative electrode in stacked contacting relation, a disc-shaped metallic cover plate fitted inside the open end of said casing, said cover plate having an inner surface in electrical connection with an electrode, and having an integral metallic contact spike on said surface thereof which is buried in and electrically engages said electrode, a tubular gasket of compressible insulating mtaerial enveloping the peripheral edge surface of said cover plate and the wall surface of the electrode which is in contact with said cover plate thereby electrically insulating said last named electrode and cover plate from the said casing, the open end of said casing being crimped over said gasket and the peripheral edge of said cover plate to hermetically seal said cover plate in the open end of said casing.

8. A miniature storage battery according to claim 7 wherein the cover plate has a circular peripheral groove on the outer surface providing a sharp bearing edge against which the casing and gasket are crimped.

References Cited in the file of this patent

UNITED STATES PATENTS

| | | |
|---|---|---|
| 496,126 | La Roche | Apr. 25, 1893 |
| 2,646,455 | Jeannin | July 21, 1953 |
| 2,798,895 | Nowotny | July 9, 1957 |
| 2,968,687 | Hutt et al. | Jan. 17, 1960 |
| 2,934,580 | Neuman | Apr. 26, 1960 |
| 2,934,581 | Dassler | Apr. 26, 1960 |
| 2,941,022 | Mandel | June 14, 1960 |
| 2,968,686 | Duddy | Jan. 17, 1961 |

FOREIGN PATENTS

| | | |
|---|---|---|
| 769,784 | Great Britain | Mar. 13, 1957 |
| 158,315 | Austria | Mar. 26, 1940 |